US007082403B2

(12) United States Patent
Wagner et al.

(10) Patent No.: US 7,082,403 B2
(45) Date of Patent: Jul. 25, 2006

(54) SYSTEM AND METHOD FOR MANAGING CUSTOMER PRODUCTIVITY THROUGH CENTRAL REPOSITORY

(75) Inventors: Michael James Wagner, Loveland, OH (US); Patrick Joseph Howard, Cincinnati, OH (US); Craig Leonard Brocklehurst, Cincinnati, OH (US); Dwight Collins Wilson, Cincinnati, OH (US); Michael Scott Godbey, Cincinnati, OH (US); James Geoffrey Chirumbolo McKee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 991 days.

(21) Appl. No.: 09/862,040

(22) Filed: May 21, 2001

(65) Prior Publication Data

US 2002/0174004 A1 Nov. 21, 2002

(51) Int. Cl.
*G06Q 10/00* (2006.01)
(52) U.S. Cl. ........................................................ 705/8
(58) Field of Classification Search ............... 705/8–10
See application file for complete search history.

(56) References Cited

U.S. PATENT DOCUMENTS

| 4,992,940 | A | 2/1991 | Dworkin |
| 5,583,763 | A | 12/1996 | Atcheson et al. |
| 5,696,965 | A | 12/1997 | Dedrick |
| 5,717,865 | A | 2/1998 | Stratmann |
| 5,963,910 | A | 10/1999 | Ulwick |
| 5,983,227 | A | 11/1999 | Nazem et al. |
| 5,999,908 | A | 12/1999 | Abelow |
| 6,018,732 | A | 1/2000 | Bertrand et al. |
| 6,037,928 | A | 3/2000 | Nachinson et al. |
| 6,049,777 | A | 4/2000 | Sheena et al. |
| 6,070,142 | A | 5/2000 | McDonough et al. |
| 6,078,924 | A | 6/2000 | Ainsbury et al. |
| 6,115,690 | A | 9/2000 | Wong |
| 6,115,691 | A | 9/2000 | Ulwick |
| 6,125,352 | A * | 9/2000 | Franklin et al. ............... 705/26 |
| 6,134,594 | A | 10/2000 | Helland et al. |
| 6,151,584 | A | 11/2000 | Papierniak et al. |
| 6,166,739 | A | 12/2000 | Hugh |
| 6,195,643 | B1 | 2/2001 | Maxwell |

(Continued)

FOREIGN PATENT DOCUMENTS

JP 05164660 A * 6/1993

OTHER PUBLICATIONS

Web.archive.org, omnifleet.com, "OmniFleet® Fleet Maintenance Software—OmniFleet Shop", Jun. 23, 1998, pp. 1-5.*

(Continued)

*Primary Examiner*—Tariq Hafiz
*Assistant Examiner*—Jonathan G Sterrett
(74) *Attorney, Agent, or Firm*—William Scott Andes; Armstrong Teasdale LLP

(57) ABSTRACT

A system and a method for managing various Customer Productivity Applications utilize a web-enabled interactive database to organize, store and retrieve information for the benefit of the customer community to effectively manage the business. The system captures all customers related information and provides on-line, up-to-date information to the users upon request. The system is configured to manage various Customer Productivity Applications to increase the customers' productivity and minimizes cost of ownership by analyzing the customers' fleet, perform industry comparisons, and run iterations to develop fleet optimal performance requirements.

20 Claims, 19 Drawing Sheets

U.S. PATENT DOCUMENTS

| | | |
|---|---|---|
| 6,195,657 B1 | 2/2001 | Rucker et al. |
| 6,208,975 B1 | 3/2001 | Bull et al. |
| 6,219,654 B1 | 4/2001 | Ruffin |
| 6,292,786 B1 * | 9/2001 | Deaton et al. ............... 705/14 |

OTHER PUBLICATIONS

Web.archive.org, omnifleet.com, "OmniFleet® Shop—Screen Shots", Jun. 23, 1998, pp. 1-2.*

Web.archive.org, omnifleet.com, "OmniFleet® Pro for Windows 95/NT", Jun. 23, 1998, pp. 1-5.*

Web.archive.org, omnifleet.com, "PM Wizard", Jun. 23, 1998, p. 1.*

Web.archive.org, omnifleet.com, "OmniFleet® Fleet Maintenance Software—Informed Purchasing Decisions", Jun. 23, 1998, pp. 1-3.*

Web.archive.org, omnifleet.com, "Equipment Information" form, Jun. 23, 1998, p. 1.*

Web.archive.org, omnifleet.com, "Repair Order" form, Jun. 23, 1998, p. 1.*

Web.archive.org, omnifleet.com, "OmniFleet® Shop Release Notes", Jun. 23, 1998, pp. 1-12.*

Web.archive.org, iomega.com, "Iomegazine™—Find the right Zip® drive for you", May 8, 1999, p. 1.*

Archive.bibalex.org. geae.com, "Welcome to the GE Engine Center", May 10, 2000, p. 1.*

Harrington, Lisa, "Bulking Up", 2000, Air Transport World, pp. 16-21.*

Web.archive.org, promodel.com, "Capacity Planning and Simulation", Feb. 21, 1999, pp. 1-2.*

Web.archive.org, geae.com, "GE Aircraft Engines", May 10, 2000, p. 1.*

Web.archive.org, geae.com, "GE Aircraft Engines" Apr. 8, 2000, p. 1.*

Web.archive.org, omnifleet.com, "Equipment Information" form, Jun. 23, 1998, p. 1.*

Web.archive.org, omnifleet.com, "OmniFleet Shop's Shop Costs Sample Report", Jun. 23, 1998, pp. 1-3.*

Web.archive.org, omnifleet.com, "Other Equipment Information" form, Jun. 23, 1998, p. 1.*

Frantz, Douglas, "To put GE Online Meant Putting a Dozen Industries Online", Mar. 29, 2000, Late Edition (East Coast), p. H29, ProQuest ID 52009095.*

Boyer, Mike, "Web brings new style to GEAE", The Cincinnati Enquirer, Mar. 14, 2000.*

Birch, Doug, "Efficiency bug bites the MRO industry", Dec. 1999, Interavia, vol. 54, Iss. 637, p. 48, ProQuest ID 47679819.*

Ackerman, Robert K, "Digital Data Processors link Aircraft engines, diagnostics", Oct. 1997, vol. 52, Iss. 2, p. 63, ProQuest ID 17954071.*

Edelheit, Lewis S, "GE's R&D strategy: Be vital", Mar./Apr. 1998, Research Technology Management, vol. 41, Iss. 2, p. 21, ProQuest ID 08956308.*

Baatz, Elizabeth, "Wave of the Future", Dec. 10, 1998, Purchasing, vol. 125, Iss. 9, P.S33, ProQuest ID 37825682.*

Business Wire, "Bombardier Chooses ENOVIA for Product and Process and Development", Jul. 1, 1998, New York, ProQuest ID 30887519.*

Business Wire, "Pratt & Whitney Announces Follow-on Order for INSIGHT Publishing Software", Sep. 9, 1999, ProQuest ID 44547997.*

Murray, Matt, "GE Aircraft Unveils Web Site to Provide Parts and Services", Feb. 11, 2000, WSJ, p. 24, ProQuest ID 49411846.*

King, Julia, "E-markets lack back-end ties", Feb. 14, 2000, ComputerWorld, vol. 34, Iss. 7, p. 1, ProQuest ID 49748690.*

Feldman, Joan, "Playing Catchup", Mar. 2000, Air Transport World, vol. 37, Iss. 3, p. 35, ProQuest ID 50830287.*

Moorman, Robert, "Net Results", Apr. 2000, Air Transport World, vol. 37, Iss. 4, p. 52, ProQuest ID 52052188.*

* cited by examiner

Customer Productivity Center

ENGINE EVALUATORS
Engine evaluator tools can help you gauge the true cost of ownership for your fleet

Engine Value Analyzer — 142
Compare the true cost of ownership of GE engines versus our competitors using actual Airframer data. Perform "what if" scenarios to see how different variables impact your cost of ownership.

→ LAUNCH

Spare Engine Calculator — 144
The Spare Engine Calculator is designed to calculate the number of spare engines required for a particular fleet of aircraft. The tool takes into account your delivery schedule, fleet utilization, and the engine's shop visit rate to determine the optimal provisioning of spare engines required to satisfy a given confidence level and prevent AOG's

→ LAUNCH

Sidebar menu:
- Home Page
- Spare Parts
- Tech Publications
- Overhaul
- MCPH Billing
- Component Repair
- Warranty Claims
- Spare Engines
- Productivity Center
- Engine Evaluators
- Service Solutions
- Upgrade Optimizers
- Remote Diagnostics
- Your Dashboads
- Product Support
- Web Support
- Account Admin
- Products & Services
- Customer Privacy
- Customer Terms

Introduction

The Aircraft Engine Maintenance Requirement Program is designed to calculate the number of spare engines required for a particular fleet of aircraft. The program takes into account the delivery schedule of the aircraft, annual aircraft utilization, and the engine's mature shop visit rate (SVR) and the time required to overhaul an engine to determine the provisioning for spare engines required to satisfy a given confidence level. The program uses a Poisson statistical distribution to determine the recommended number of spare engines for the specified confidence level of protection.

Functionality

Simply look up the applicable engine/aircraft combination and then fill out the number of aircraft you have in service and the number of hours you plan to operate those aircraft on an annual basis as well as your expected shop visit rate. For turn around time we have provided some estimates. You can use those or other values, depending on your own experience. To calculate a 16 year spare engine plan select "Display 16 Years." To enter Monthly Airframe delivery schedule select "Advanced." Lastly, select a "Required Confidence Level" which is the probability of having a spare engine on hand when one is required. Based on the values you enter, the model will calculate the number of recommended spares and will also provide the confidence level of your current spare coverage. To print page select "Printable Page." By entering different values you can rerun the model to assist in your decision process.

FIG. 13

File Edit View Favorites Tools Help

- Home Page
- Spare Parts
- Tech Publications
- Overhaul
- MCPH Billing
- Component Repair
- Warranty Claims
- Spare Engines
- Productivity Center
- Engine Evaluators
- Service Solutions
- Upgrade Optimizers
- Remote Diagnostics
- Your Dashboards
- Product Support
- Web Support
- Account Admin
- Products & Services Customer Privacy
Customer Terms

Customer Productivity Center

MAINTENANCE EVALUATOR
Rate the importance of specific attributes and we'll match a solution tailored to your preferences.

Engine Model: [—Select—▼]   Solution Desired: [Overhaul▼]

Service Scope: [Engine Overhaul▼]

Please weight the following attributes based on their importance to your needs.
Each time you allocate points, your Total Points are adjusted accordingly.

Your Needs
⓪ = indifferent  ① = strongly interested  ② = critical

⑦ Total Points Available

| Left | Attribute | Right |
|---|---|---|
| GEES Fleet Management Workscope Expertise ②—①—⓪—①—② | TECHNICAL EXPERTISE | Self Manage Each Workscope |
| Predictable Maintenance Cost ②—①—⓪—①—② | CASH FLOW MANAGEMENT | Time & Material Billing As SVs Occurs |
| Long Term Relationship (5 years) ②—①—⓪—①—② | PROGRAM TIME SPAN | Short Term-Per Engine Basis |
| 100% GE Risk ②—①—⓪—①—② | RISK TRANSFER PRODUCT | 100% Customer Risk |
| Reduce Administrative Cost ②—①—⓪—①—② | MAINTENANCE PROGRAM MANAGEMENT | Utilize Current Maintenance Structure |

Your Results

MCPH ▲                    T&M

Based on your inputs, a GEES MCPH Program would present the following benefits to your organization
- GEES is Managing 44 Fleet Contracts to Date
- Monthly Payment Plan Based on Number of Hours Flown ($/Engine Flight Hour)
- GEES Optimizes the Performance & Life Cycle Costs of Your Engines
- GEES Provides up To Full Coverage For Your Fleet

Your Additional Service Needs
Select Areas of Interest Below

| Operations | Value-Added Products | Information Systems |
|---|---|---|
| ☐ Time On Wing Predictability | ☑ On Wing Support Services | ☐ Remote Diagnostics & Analysis |
| ☑ Turn Around Time Predictability | ☑ Engine Leasing/spares | ☐ Aviation Information Solutions |
| ☐ Service Disruption Reduction | ☑ Engine Upgrades | |
| | ☐ Line Replaceable Units (LRU) | |

( GET YOUR CUSTOMIZED PROGRAM DESCRIPTION )  ( REQUEST A PROPOSAL )  ( GET A QUOTE )

SYSTEM AND METHOD FOR MANAGING CUSTOMER PRODUCTIVITY THROUGH CENTRAL REPOSITORY

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND OF THE INVENTION

This invention relates generally to management of customer productivity, and more particularly, to network-based systems and methods for creating password protected website containing tools and information necessary to improve customer productivity.

There is no central repository of customer productivity applications to assist customers in improving productivity and making recommendations on product offering. Currently customer have very limited, or no access, to applications that can increases their productivity and minimizes cost of ownership by providing the ability to analyze fleet data, perform industry comparisons, and execute iterations to provide optimal product and service solutions.

The Internet is used extensively in managing day-to-day business, and is also a source and a method of communication with customers. There is a growing need for corporations to disseminate products as well as service information to customers in a timely fashion to meet aggressive revenue and profitability targets. When the information on a corporation's products and services is not centralized, significant confusion may be caused for customers and may result in a loss of business. Customer confusion may lead to a loss of loyalty and ultimately impact on market performance. For example, multiple avenues for ordering a product may create not only confusion, but also significant dissatisfaction to customers if the web site is not properly organized. Similar problems may exist when customers seek simple product related technical information. Lack of web site organization may force customers to either make multiple calls to resolve problems or seek alternative sources for the product or services.

The problem is more acute in large organizations having multiple divisions, and especially organizations with globally distributed divisions, in which managing a customer desires may require more immediate attention and review. Additionally, even the organizations which use web technology to streamline the process may be unable to manage this huge amount of customer required information rapidly and efficiently because of their inability to organize and present the information in a meaningful way to different users having different needs.

Therefore, it would be desirable to streamline the process and make electronically available tools and information necessary for customers to run their business while assisting them in making timely decisions with respect to a corporation's products and services. In addition, it would be desirable to implement systems and processes that will manage the extranet that facilitates expeditious and efficient dissipation of information to multiple customers at different locations.

BRIEF SUMMARY OF THE INVENTION

In an exemplary embodiment, a searchable web-based centralized system manages an Engine Value Analyzer, a Spare Engine Calculator, an Engine Workscoping Wizard, a Maintenance Evaluator, and a Fan Speed Modifier Wizard. A Customers Productivity Center (CPC) helps a customer access and select customer productivity applications to improve their fleet application via a Customer Web Center. For example, if a customer selects the performance Optimizer (Fan Speed Modifier), the customer can view how their fleet "time on wing" values compare to their competition. The CPC then projects a quantified benefit (increased hours on wing, resulting in fewer maintenance shop visits), that would be realized if the customer engages in the upgrade. The tool, also performs a financial analysis (ROI/NPV/Months to payback) associated with the upgrade as well.

The CPC creates a central repository of extranet applications for customers to access that provide recommendations on product and service offerings. The CPC combines new technology, product specific applications, and customer and industry data to give customers the ability to increase their productivity and minimizes their cost of ownership by analyzing their fleet, performing industry comparisons, and running iterations that develop their optimal performance requirements.

A Customers Productivity Center (CPC), in one embodiment, includes a web-enabled interactive database to manage customer productivity applications on-line. The CPC captures customers' relevant information and provides on-line, up-to-date information upon request. The CPC tracks customers' relevant information from inception to completion and provides a status to users in response to their inquiries. Additionally, the CPC provides on-line wizard application that address customer issues or questions based on a set of questions. In the exemplary embodiment, the system utilizes a Relational Database with a front-end client user interface for administration and a web interface for standard user input and reports. Information is accessed in the database through Structured Query Language (SQL). The CPC includes a centralized interactive database for use in automating documentation, monitoring and tracking activities associated with management of various customer productivity applications of a corporation.

In one embodiment of the invention, the CPC is a method for organizing customer productivity applications of users having similar needs and interests using a web-based system including a server system coupled to a centralized interactive database and at least one client system. The method includes the steps of defining various customer productivity applications and users of various customer productivity applications, identifying tools and information relating to various customer productivity applications, setting up a number of pre-defined modules for each customer productivity application, and providing users access to a specific customer productivity application and associated modules of the specific customer productivity application to obtain information stored in a centralized database in response to an inquiry.

The CPC supports various levels of management hierarchy and provides access to individuals based on the position held by the individual within the business entity. In another embodiment, the CPC is a system configured to manage the process to organize various customer productivity applications.

In yet another embodiment, the invention is a computer program embodied on a computer readable medium for managing various customer productivity applications for a corporation. The program includes a code segment that sets up a directory structure to organize information into a centralized database and provides users access to a specific customer productivity application and it's associated modules to obtain information stored in the centralized database in response to an inquiry.

BRIEF DESCRIPTION OF THE DRAWINGS

FIG. 5 is an exemplary embodiment of a user interface from which a customer can launch an Engine Value Analyzer and a Spare Engine Calculator;

FIG. 9 is an exemplary embodiment of various user interfaces of the Engine Value Analyzer;

FIG. 10 is an exemplary embodiment of yet other user interfaces of the Engine Value Analyzer;

FIG. 12 is an exemplary embodiment of various user interfaces of the Spare Engine Calculator;

FIG. 13 is an exemplary embodiment of a user interface of the Maintenance Evaluator;

FIG. 14 is an exemplary embodiment of another user interface of the Maintenance Evaluator;

FIG. 15 is an exemplary embodiment of yet other user interfaces of the Maintenance Evaluator;

DETAILED DESCRIPTION OF THE INVENTION

Figure 1:
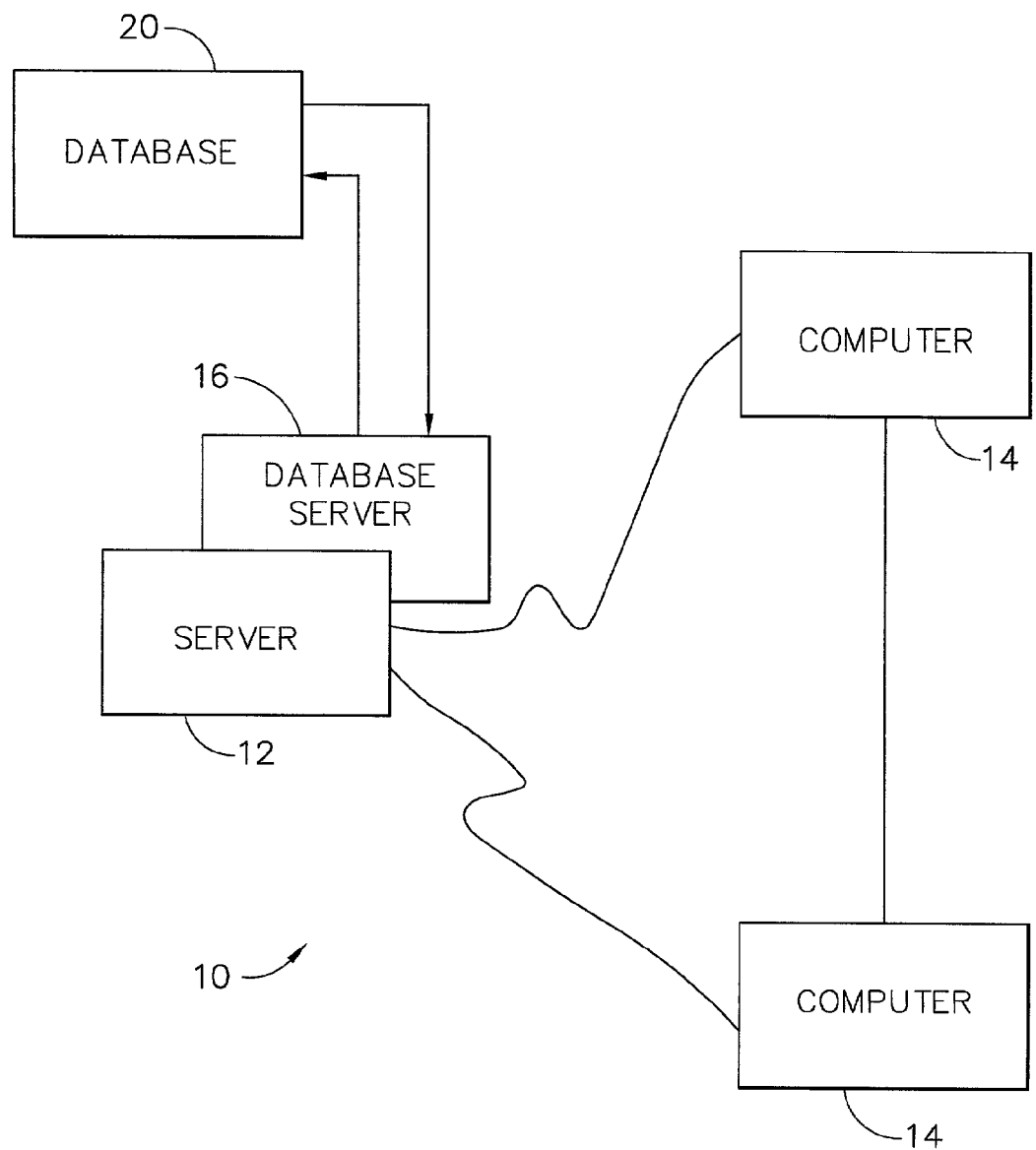
FIG. 1 is a simplified block diagram of a Customers Productivity Center (CPC) in accordance with one embodiment of the present invention.

FIG. 1 is a simplified block diagram of a Customer Productivity Center (CPC) 10 including a server system 12 and a plurality of client systems 14 connected to server system 12. CPC 10 provides a system and a methodology to for customers to help analyze their needs and interests without the intervention of a corporation that supplied products and services. For example, in one exemplary embodiment, the CPC is launched from a home page of the corporation's web site and is organized as a group of five different customer extranet applications: an Engine Value Analyzer, a Spare Engine Calculator, an Engine Workscoping Wizard, a Maintenance Evaluator, and a Fan Speed Modifier Wizard. Tools and information pertinent for various customers are identified and set up as web site modules which are selectively accessible by customers. Private and confidential information entered by a customer cannot be accessed by any other customer. Each web site or extranet application has a set number of modules. CPC 10 manages all defined customer applications of the corporation.

For example, CPC 10 manages an Engine Value Analyzer, a Spare Engine Calculator, an Engine Workscoping Wizard, a Maintenance Evaluator, and a Fan Speed Modifier Wizard. CPC 10 helps a customer access the customer productivity applications via the Customer Web Center and enables a customer to select from a suite of tools to improve their fleet performance. For example, if the customer selects the performance Optimizer (Fan Speed Modifier), an airline customer can view how their fleet "time on wing" values compare to associated values of their competition. CPC 10 then projects to the customer the quantified benefit (increased hours on wing), that would be realized if the customer engages in the upgrade. The tool also performs a financial analysis (ROI/NPV/Months to payback) associated with the upgrade as well.

CPC 10 creates a central repository of extranet applications for customers to access that provide recommendations on product and services offerings. CPC 10 combines new technology, product specific applications, and customer and industry data and provides the customer the ability to increase their productivity and minimize their cost of ownership by analyzing their fleet, performing industry comparisons, and running iterations to develop their optimal performance requirements. Some examples, as stated earlier, include the Spare Engine Calculator, Engine Value Analyzer, Maintenance Evaluator, and Fan Speed Modifier Applications.

In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone or other web-based connectable equipment. A database server 16 is connected to a centralized database 20 containing product-related information on a variety of products, as described below in greater detail. In one embodiment, centralized database 20 is stored on database server 16 and can be accessed by potential users at one of client systems 14 by logging onto server system 12 through one of client systems 14. In an alternative embodiment centralized database 20 is stored remotely from server system 12.

The CPC utilizes a web-enabled interactive database to automate information and management process. System 10 captures all customer applications related information, and provides on-line, up-to-date information upon request. In one exemplary embodiment, system 10 utilizes a Relational Database with a front-end client user interface for administration and a web interface for standard user input and reports. Information is accessed in the database through Structured Query Language (SQL). CPC 10 is an information and management tool that can be used effectively to build a stronger relationship with the customer base.

System 10 supports various levels of management hierarchy and provides access to individuals based on the position held by the individual within the corporation.

Figure 2:
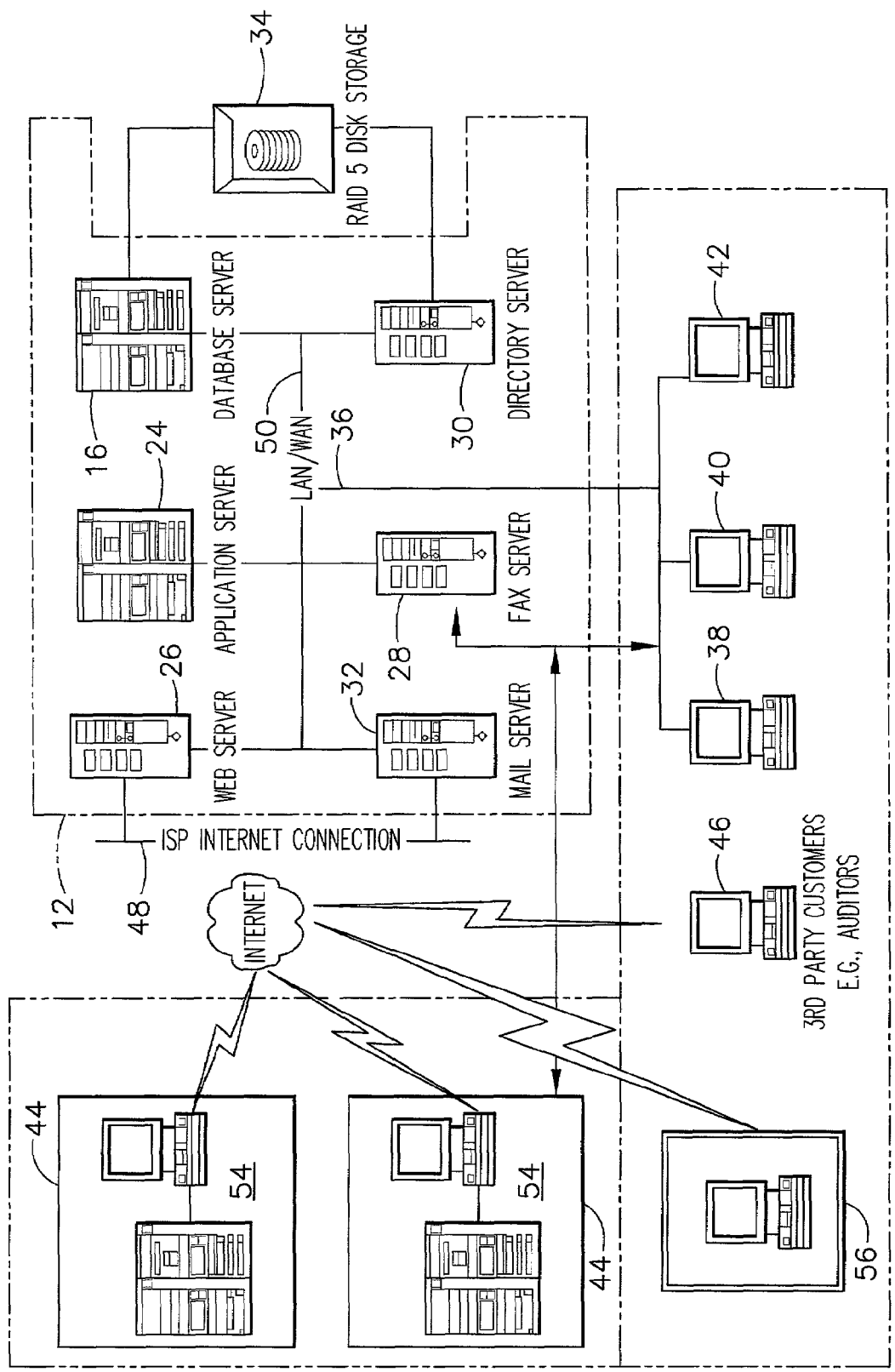
FIG. 2 is an expanded version block diagram of an exemplary embodiment of a server architecture of the CPC.

FIG. 2 is an expanded version block diagram of an exemplary embodiment of a server architecture of a CPC 22. CPC 22 is utilized when the customer productivity applications are numerous and require a more elaborate and more powerful system architecture. Components in system 22, identical to components of system 10 (shown in FIG. 1), are identified in FIG. 2 using the same reference numerals used in FIG. 1. System 22 includes server system 12 and client systems 14. Server system 12 further includes a database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server system 12 is configured to be communicatively coupled to various individuals or employees 44 and to third parties, e.g., internal or external auditors, 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50.

In the exemplary embodiment, any authorized individual or an employee of the corporation having a workstation 54 can access CPC 22. One of the client systems includes a senior manager's workstation 56 located at a remote location. Workstations 54 and 56 are personal computers having a web browser. Also, workstations 54 and 56 are configured to communicate with server system 12. Furthermore, fax server 28 communicates with employees located outside the business entity's 44 and any of the remotely located client systems, including a client system 56 via a telephone link. Fax server 28 is configured to communicate with other client systems 38, 40, and 42 as well.

Figure 3:
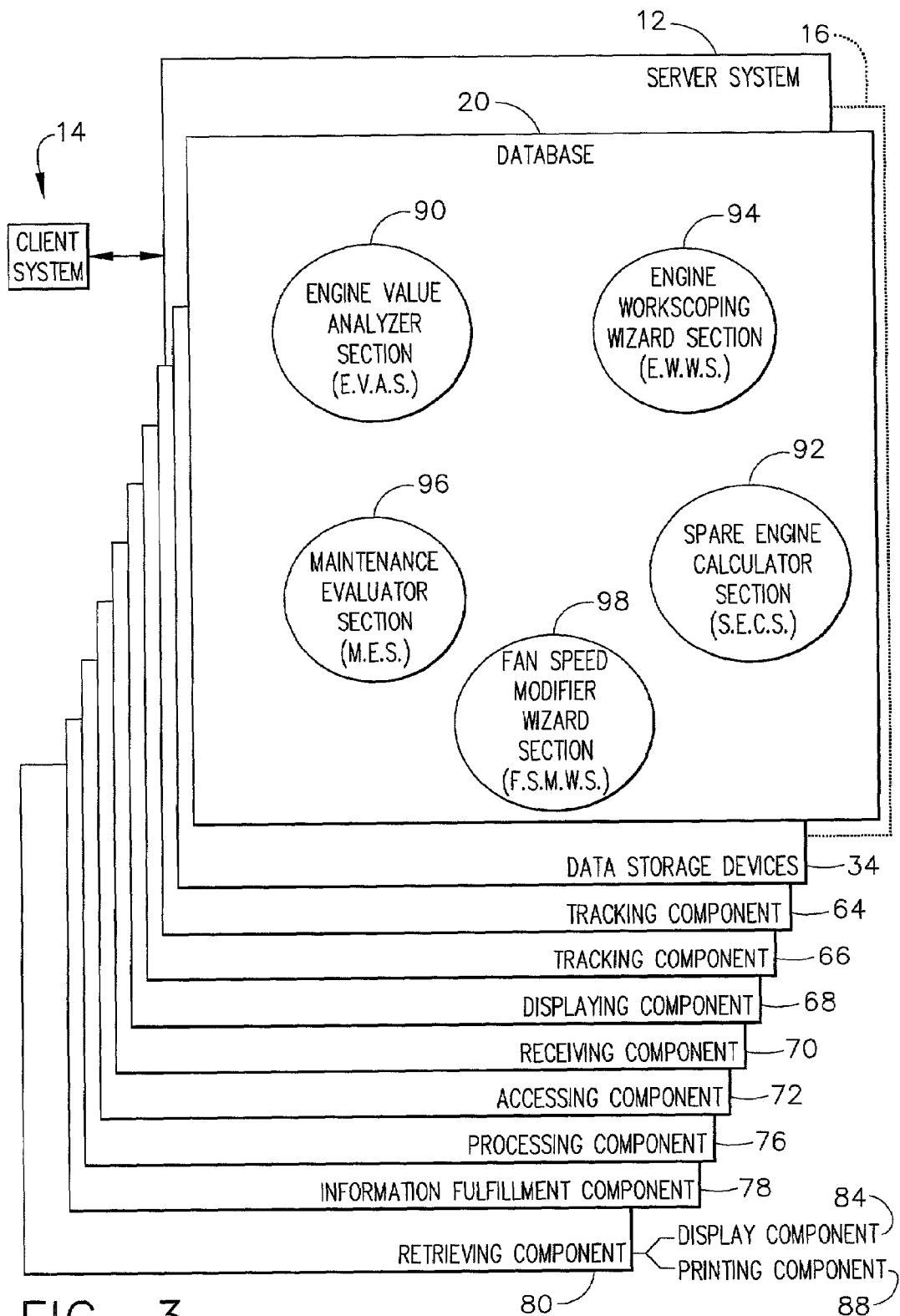
FIG. 3 shows a configuration of a database within the database server of the server system with other related server components.

FIG. 3 shows a configuration of database 20 within database server 16 of server system 12 (shown in FIG. 1). Database 20 is coupled to several separate components, described in more detail below, within server system 12, which perform specific tasks.

Server system 12 includes a collection component 64 for collecting information from users into centralized database 20, a tracking component 66 for tracking information, a displaying component 68 to display information, a receiving component 70 to receive a specific query from client system 14, and an accessing component 72 to access centralized database 20. Receiving component 70 is programmed for receiving a specific query from one of a plurality of users. Server system 12 further includes a processing component 76 for searching and processing received queries against data storage device 34 containing a variety of information collected by collection component 64. An information fulfillment component 78, located in server system 12, downloads requested information to the plurality of users in an order in which the requests were received by receiving component 70. Information fulfillment component 78 downloads the information after the information is retrieved from data storage device 34 by a retrieving component 80. Retrieving component 80 retrieves, downloads, and sends information to client system 14 based on a query received from client system 14 regarding various alternatives.

Retrieving component 80 also includes a display component 84 configured to download information to be displayed on a client system's graphical user interface, and a printing component 88 configured to print information. Retrieving component 80 generates various reports requested by the user through client system 14 in a pre-determined format. System 10 is flexible to provide alternative reports and is not constrained to the options set forth above.

Database 20 is divided into several individual sections to store information on variety of different customer oriented applications. For example, database 20 is divided into several Customer Application Sections including, but not limited to, a Engine Value Analyzer Section (EVAS) 90, Spare Engine Calculator Section (SECS) 92, Engine Workscoping Wizard Section (EWWS) 94, Maintenance Evaluator Section (MES) 96, and Fan Speed Modifier Wizard Section (FMWZ) 98. Sections 90, 92, 94, 96 and 98 within database 20 are interconnected to update and retrieve the information as required. Each Customer Application Section is further divided into several individualized sub-sections to store data in various different categories.

The architecture of system 10, as well as various components of system 10, is exemplary only. Other architectures are possible and can be utilized in connection with practicing the processes described below.

FIG. 4 through FIG. 19 depict one arrangement of organizing Customer Productivity Applications. The examples shown in these embodiments are exemplary only and there are a plurality of variations possible. Through a series of user interfaces, the customer is provided various useful information options. FIGS. 4 through 19 demonstrate the type of the information accumulated, stored and updated on a regular basis to support various Customer Productivity Applications. The information contained in these user interfaces is exemplary only and changes from one Customer Productivity Application to another. The information provided through the user interfaces depicted in FIGS. 4 through 19 is stored in centralized database 20 (shown in FIG. 1) and retrieved by server system 12 (shown in FIG. 1) as required. Many variations of particular user interfaces or screens viewable by the customer may be utilized. The following description refers to one set of screens that can be used to prompt the user to retrieve variety of information or to make the necessary inputs to enable the system to generate various reports, charts, or status reports. Of course, many variations of such screens are possible.

Figure 4:
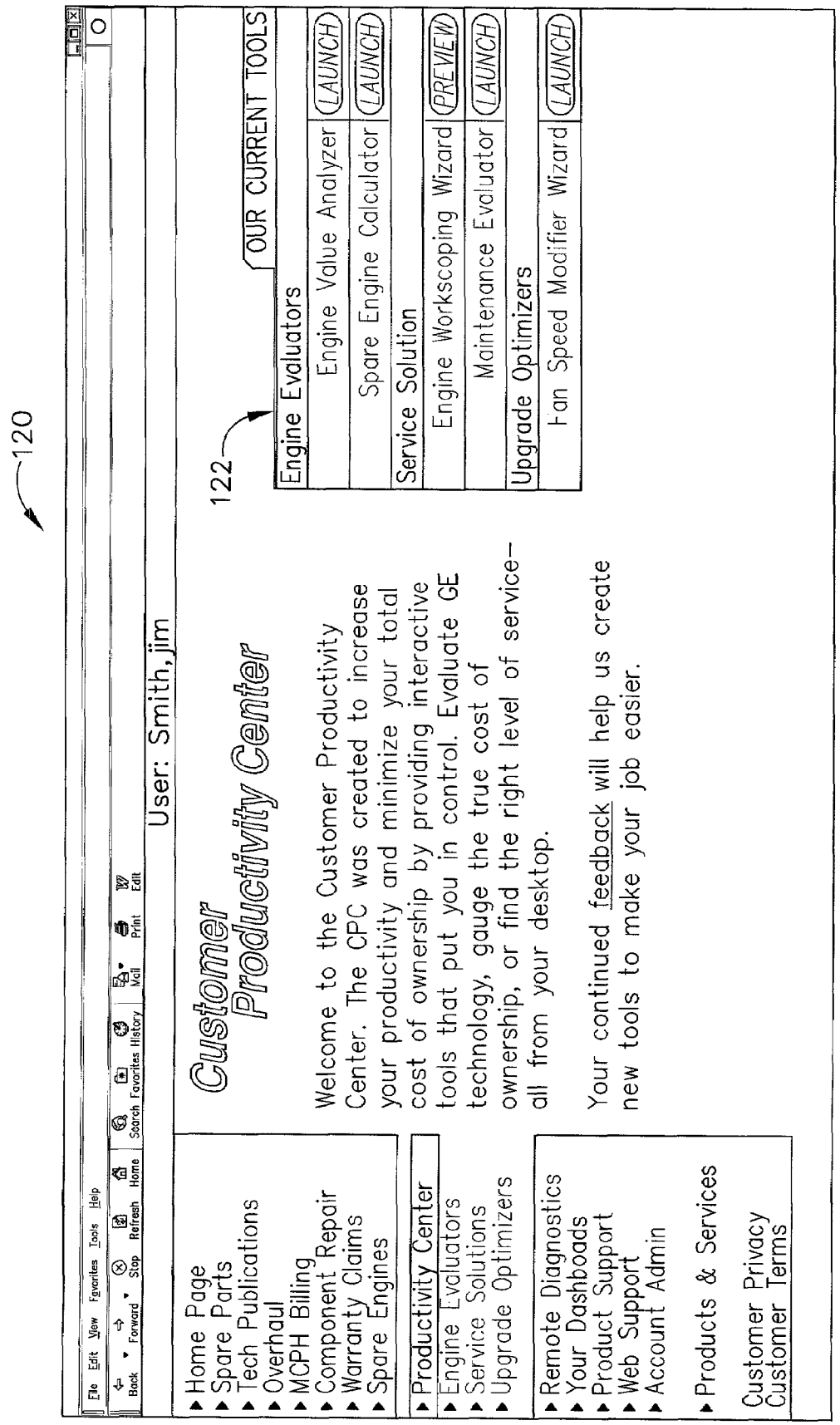
FIG. 4 is an exemplary embodiment of a home page of the customer productivity center from which various customer productivity applications can be launched by a customer.

FIG. 4 is an exemplary embodiment of a home page 120 of the customer productivity center from which various customer productivity applications can be launched by the customer. CPC 10 manages all defined customer productivity applications of a corporation. CPC 10 provides a system and a methodology to group customers in customer productivity applications. Home page 120 is organized to increase customers' productivity and minimize a total cost of ownership by providing interactive tools that put customers in control. Customers are able to evaluate technology, gauge the true cost of ownership, or find the right level of service-all from their own desktop without seeking any assistance from sales personnel. In the exemplary embodiment, customers are able to evaluate technology available from General Electric Company (GE).

Because CPC home page 120 provides a methodology to group customers in customer productivity applications, CPC limits which Customer Application Sections a customer may access. Specifically, not only does CPC monitor the security of the system and restrict access to unauthorized individuals, CPC also personalizes home page 120. More specifically, home page 120 is only accessible by a customer having pre-defined security access.

A Customer Application Sections launch display 122 is provided within home page 120 that is personalized to the customer such that the customers may only access or launch those only those sections, 90, 92, 94, 96, and 98 that are relevant to the customer. Additionally, Customer Application Sections launch display 122 also permits pre-defined customers to preview application sections that may not be currently pertinent to the customer, but may be relevant to the customer in the future. As a result, previewing enables a customer to view the application without actually using the application. For example, in the exemplary embodiment the customer may access Engine Value Analyzer Section (EVAS) 90, Spare Engine Calculator Section (SECS) 92, Maintenance Evaluator Section (MES) 96, and Fan Speed Modifier Wizard Section (FMWZ) 98, but may only preview Engine Workscoping Wizard Section (EWWS) 94.

FIG. 5 is an exemplary embodiment of a user interface 140 from which the customer can launch an Engine Value Analyzer 142 and a Spare Engine Calculator 144. Engine Value Analyzer 142 compares the true cost of ownership of GE engines versus competitors of GE using actual Airframer data. Engine Value Analyzer 142 performs "what if" scenarios to see how different variables impact the customer's cost of ownership.

Spare Engine Calculator 144 is designed to calculate a number of spare engines required for a particular fleet of aircraft. Spare Engine Calculator 144 takes into account a customer's delivery schedule, fleet utilization, and an engine's shop visit rate to determine an optimal provisioning of spare engines required to satisfy a given confidence level and prevent AOG's.

Figure 6:
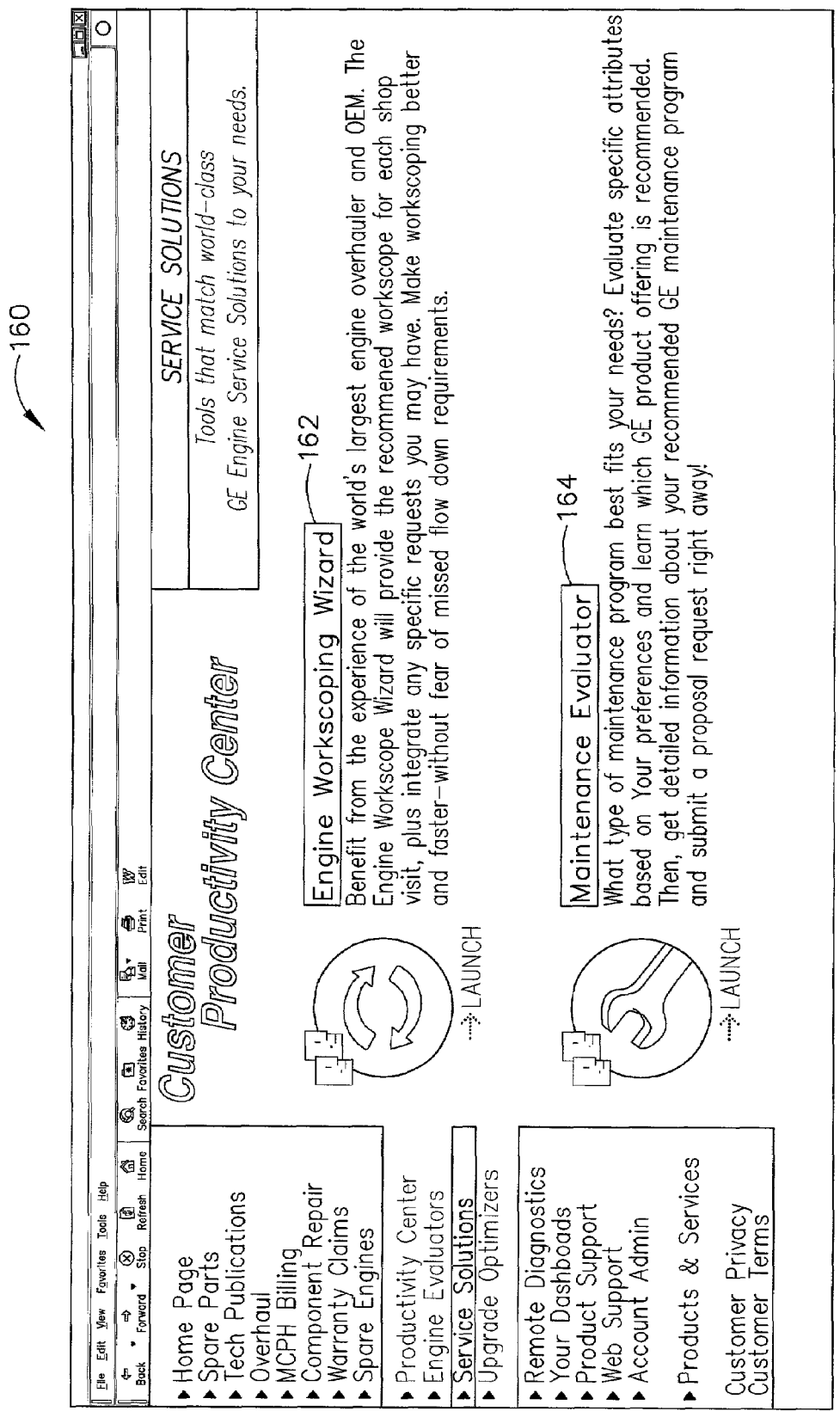
FIG. 6 is an exemplary embodiment of a user interface from which a customer can launch an Engine Workscoping Wizard and a Maintenance Evaluator.

FIG. 6 is an exemplary embodiment of a user interface 160 from which the customer can launch an Engine Workscoping Wizard 162 and a Maintenance Evaluator 164.

Engine Workscoping Wizard 162 provides an additional benefit of experience to the customer which has been accumulated by the corporation over years in engine overhaul and OEM business. Engine Workscoping Wizard 162 provides a recommended work scope for each shop visit, plus integrates any specific requests the customer may have.

Maintenance Evaluator 164 evaluates a best possible maintenance program for the customer. Maintenance Evaluator 164 evaluates specific attributes based on preferences entered by the customer and makes recommendations on various products offerings. Maintenance Evaluator 164 also provides detailed information about the recommended maintenance program and submits a proposal request.

Figure 7:
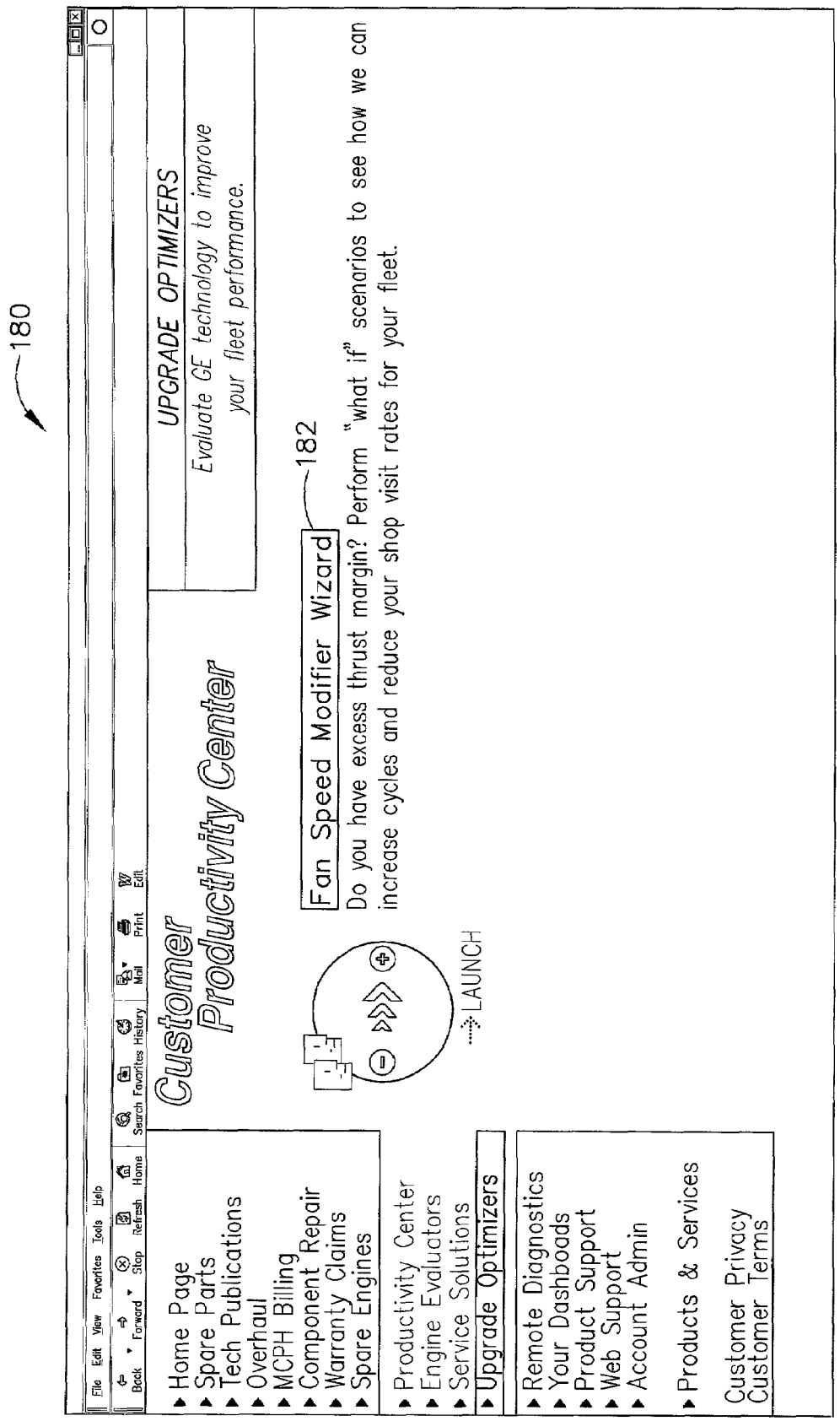
FIG. 7 is an exemplary embodiment of a user interface from which a customer can launch a Fan Speed Modifier Wizard.

FIG. 7 is an exemplary embodiment of a user interface 180 from which the customer can launch a Fan Speed Modifier Wizard 182. Fan Speed Modifier Wizard 182 identifies whether there is an excess thrust margin. Fan Speed Modifier Wizard 182 further performs "what if" scenarios to see how the corporation can increase cycles and reduce maintenance shop visits for the fleet.

Figure 8:
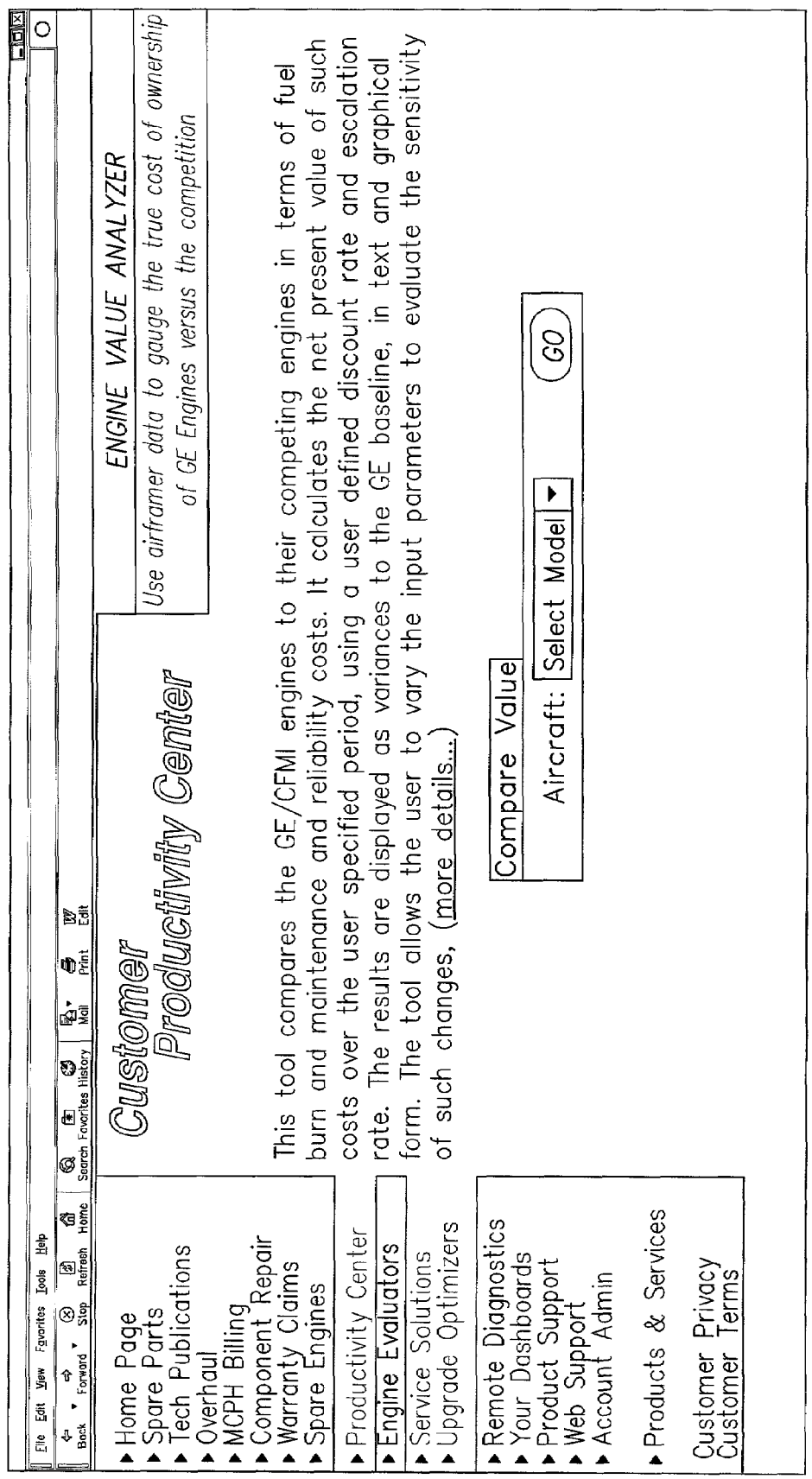
FIG. 8 is an exemplary embodiment of one of a user interface of the Engine Value Analyzer.
Figure 9:
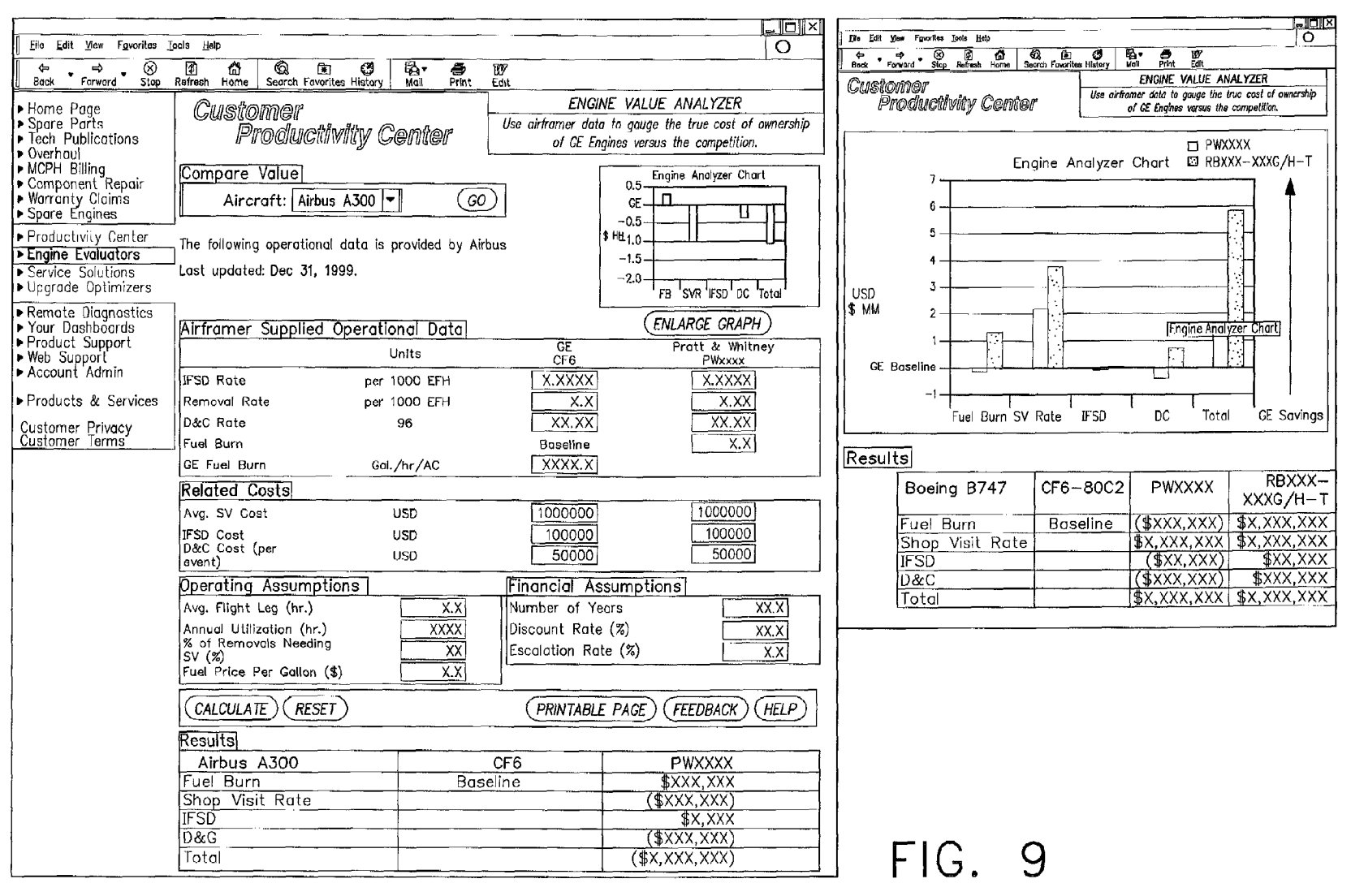
Figure 10:
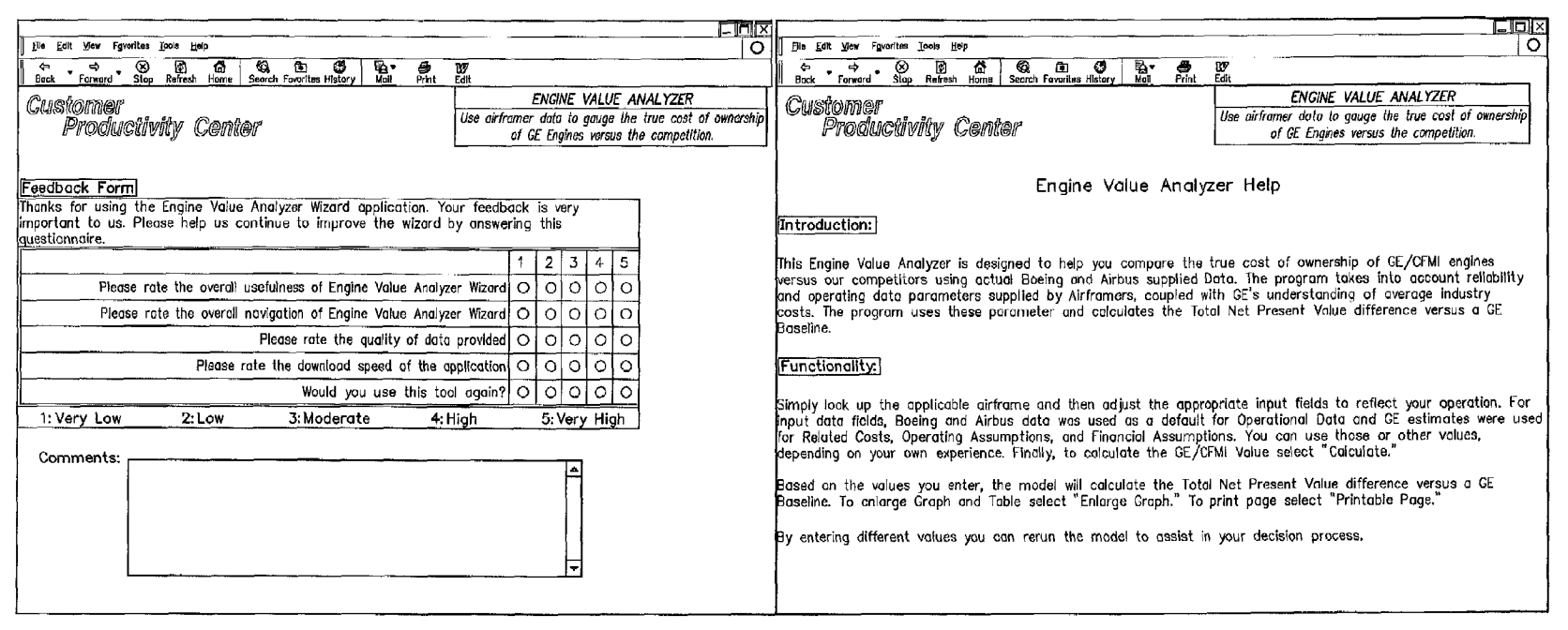

FIGS. 8, 9 and 10 are exemplary embodiments of various user interfaces of the Engine Value Analyzer. Engine Value Analyzer user interfaces are downloaded and displayed by server system 12 when the user selects Engine Value Analyzer 142 hypertext link (shown in FIG. 5).

Engine Value Analyzer 142 tool compares the corporation's engines to their competing engines in terms of fuel burn, maintenance, and reliability costs. Engine Value Analyzer 142 calculates a net present value of such costs over a specified period specified by the user, using a user-defined discount rate and escalation rate. The results are displayed as variances to the GE baseline, in text and graphical form. Tool 142 allows the user to vary the input parameters to evaluate the sensitivity of such changes.

Engine Value Analyzer 142 is designed to assist the customer compare the true cost of ownership of the corporate product (i.e. engines) versus the competitors' using actual aircraft fleet supplied Data. Engine Value Analyzer 142 takes into account reliability and operating data parameters supplied by Airframers, coupled with the corporation's own understanding of average industry costs. Engine Value Analyzer 142 further uses these parameters and calculates the Total Net Present Value difference versus a GE Baseline.

The customer is expected to review the applicable airframe and then adjust the appropriate input fields to reflect the customer's own operation. Based on the data input by the customer, CPC 10 computes the Total Net Present Value difference versus a GE Baseline. By entering different values, Engine Value Analyzer 142 assists in the customer decision making process.

Figure 11:
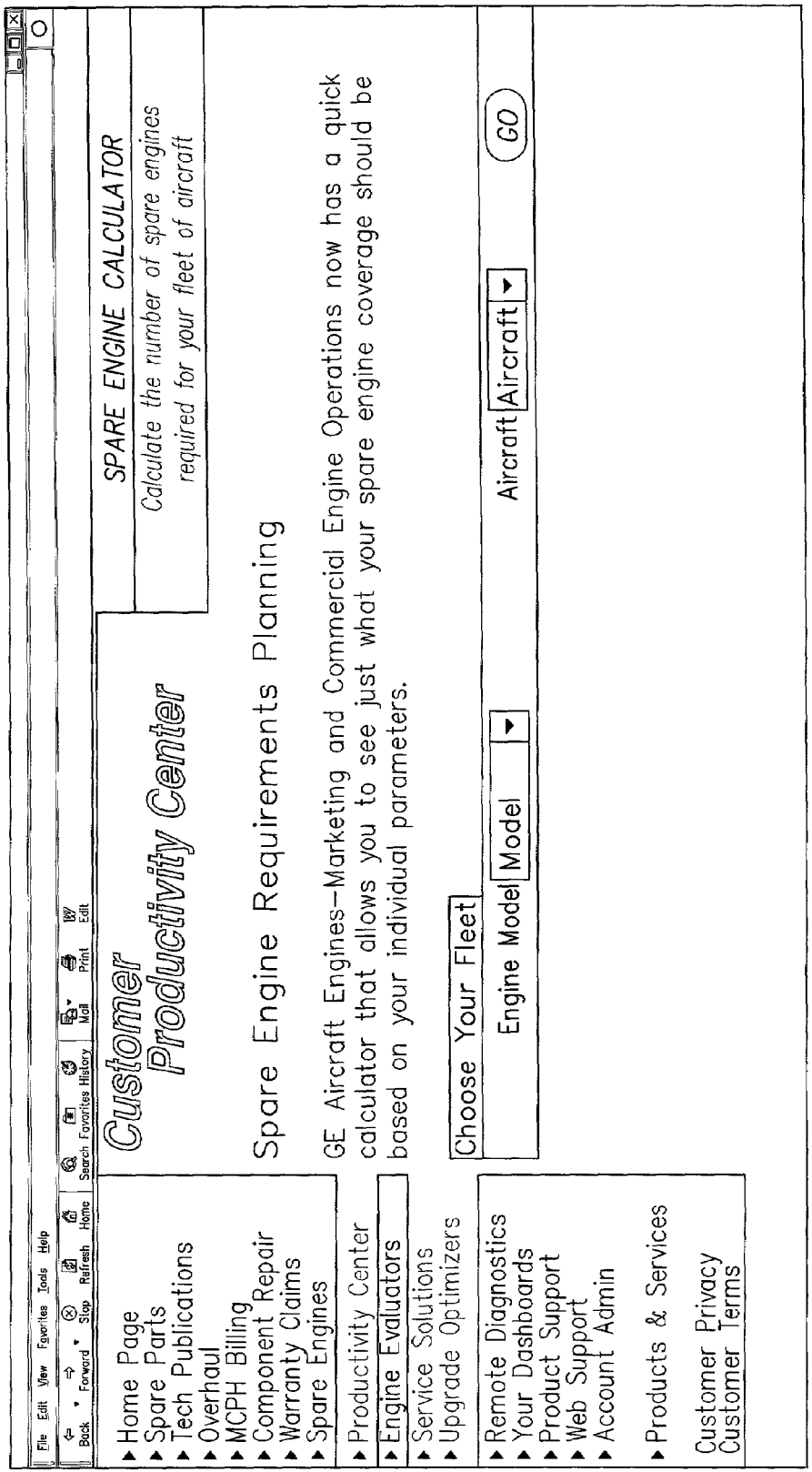
FIG. 11 is an exemplary embodiment of a user interface of the Spare Engine Calculator.
Figure 12:
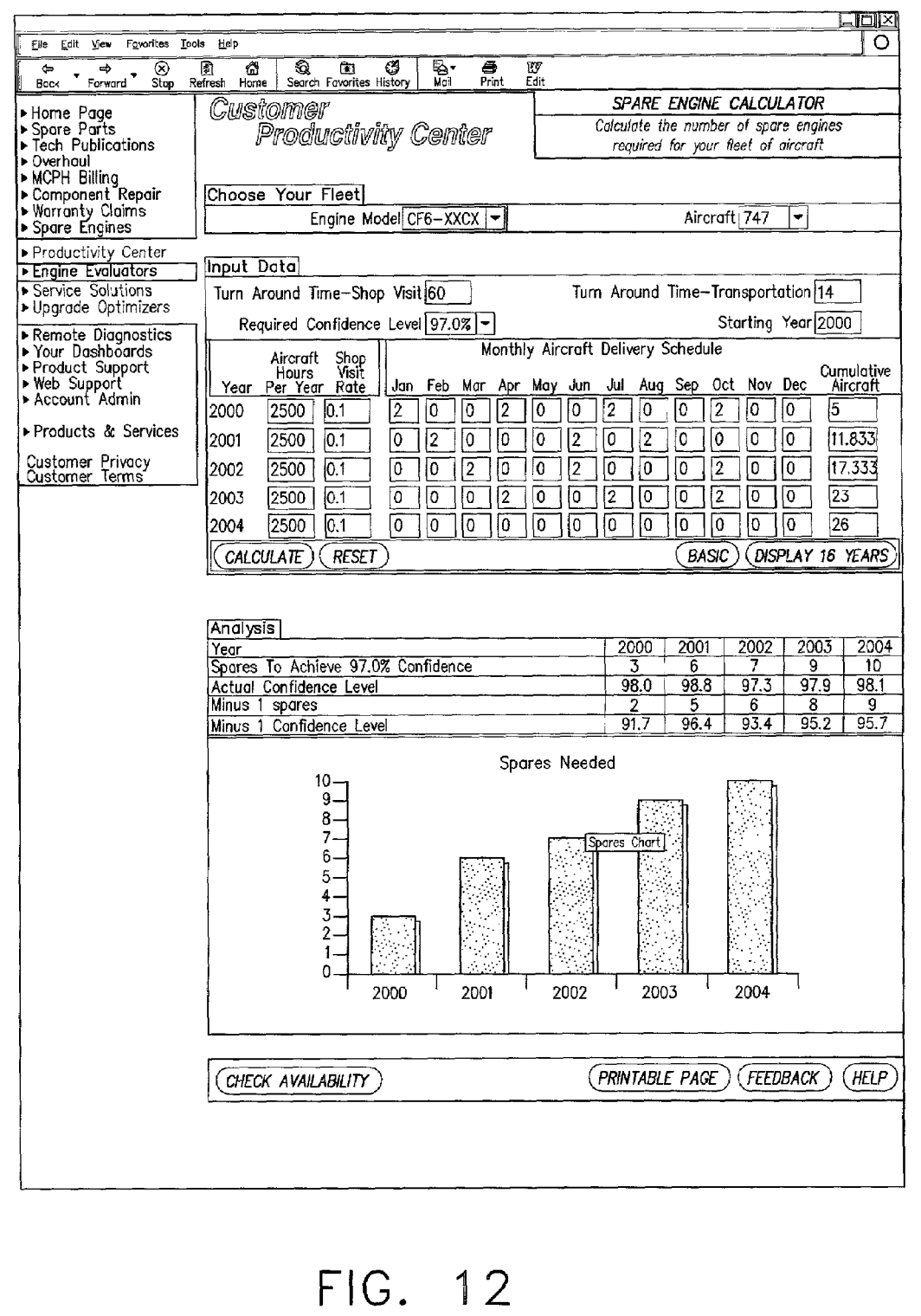
Figure 16:
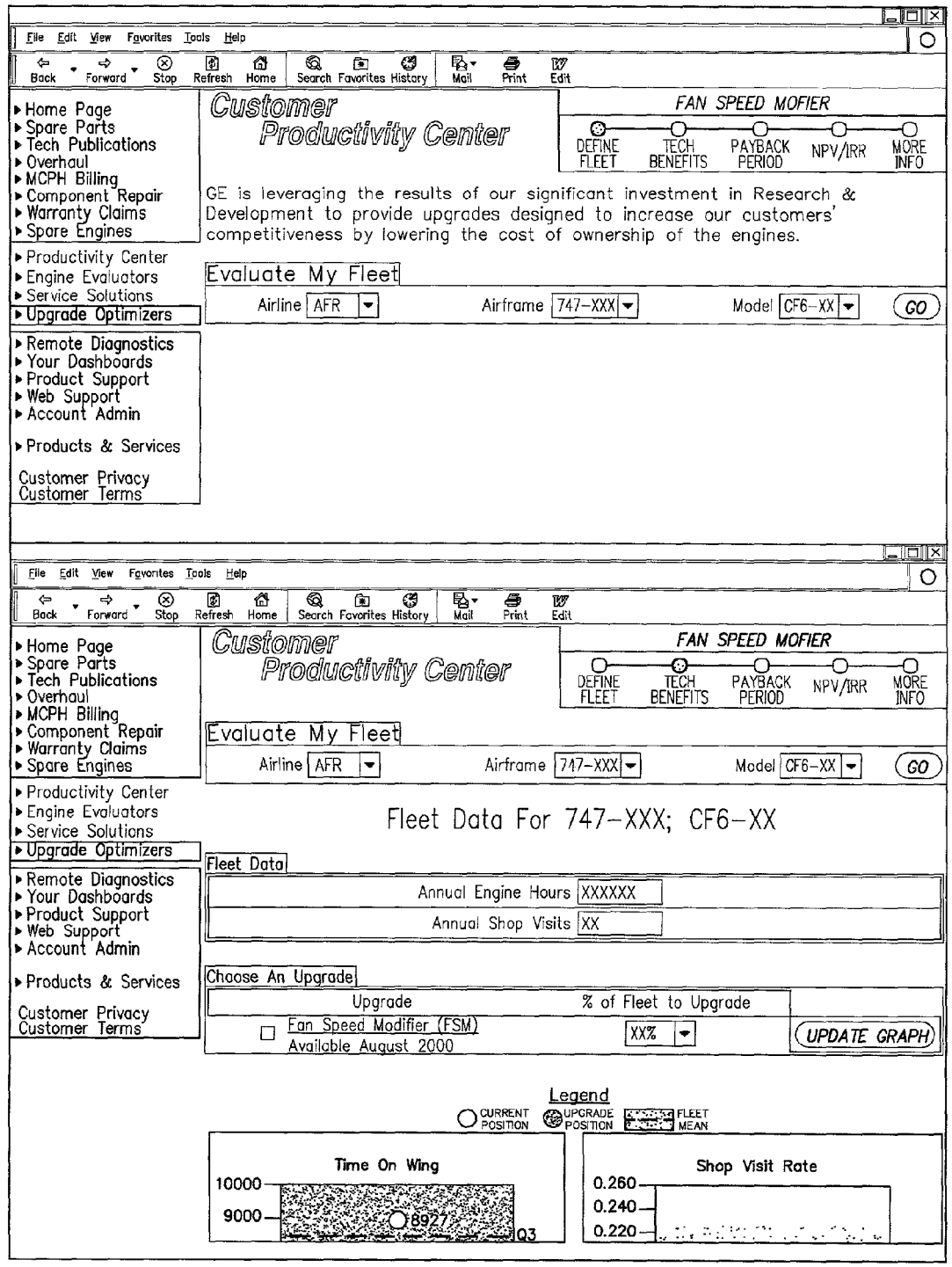
FIG. 16 is an exemplary embodiment of user interfaces of the Fan Speed Modifier Wizard.
Figure 17:
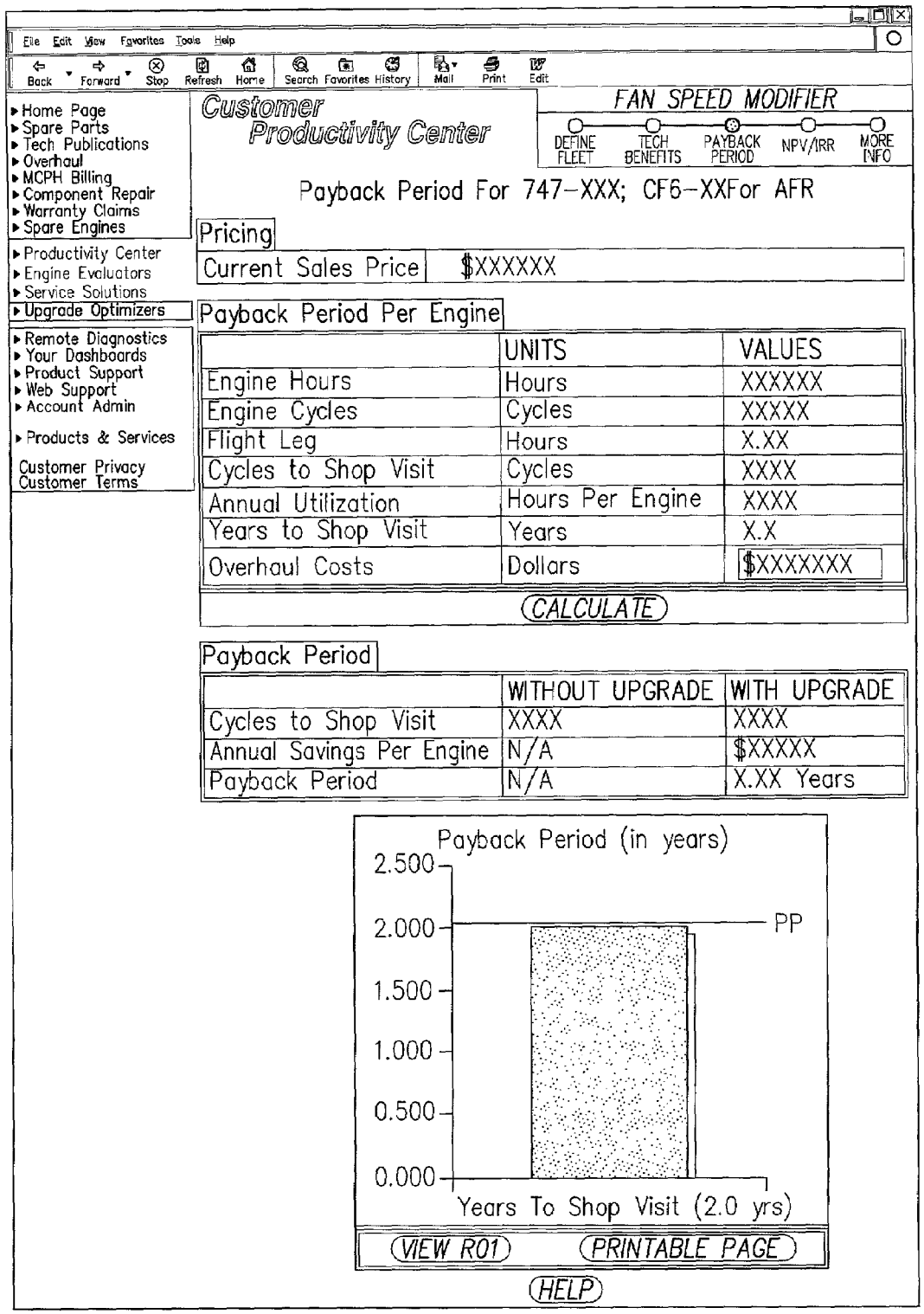
FIG. 17 is an exemplary embodiment of several others user interfaces of the Fan Speed Modifier Wizard.
Figure 18:
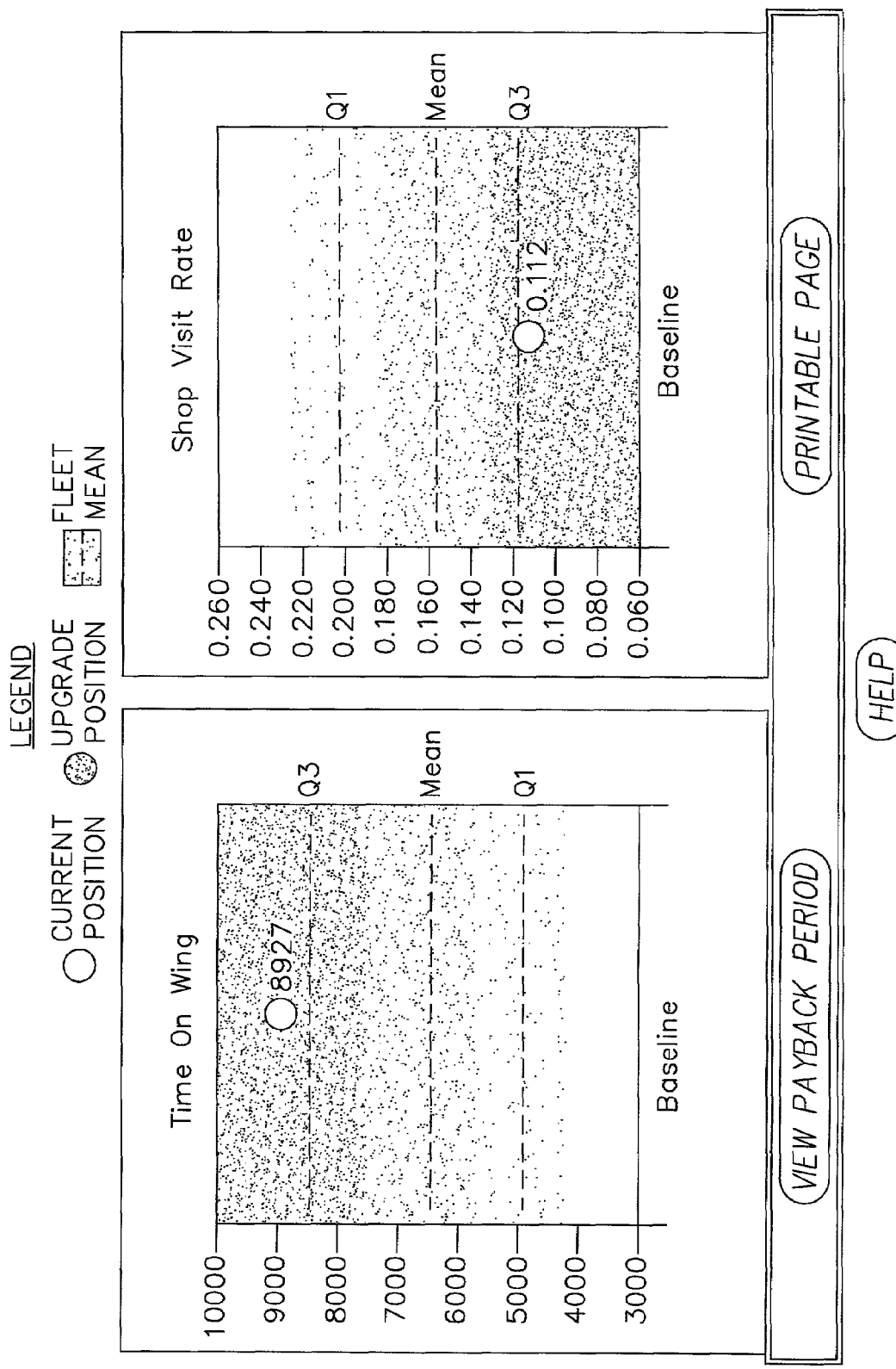
FIG. 18 is an exemplary embodiment of yet another interface of the Fan Speed Modifier Wizard.
Figure 19:
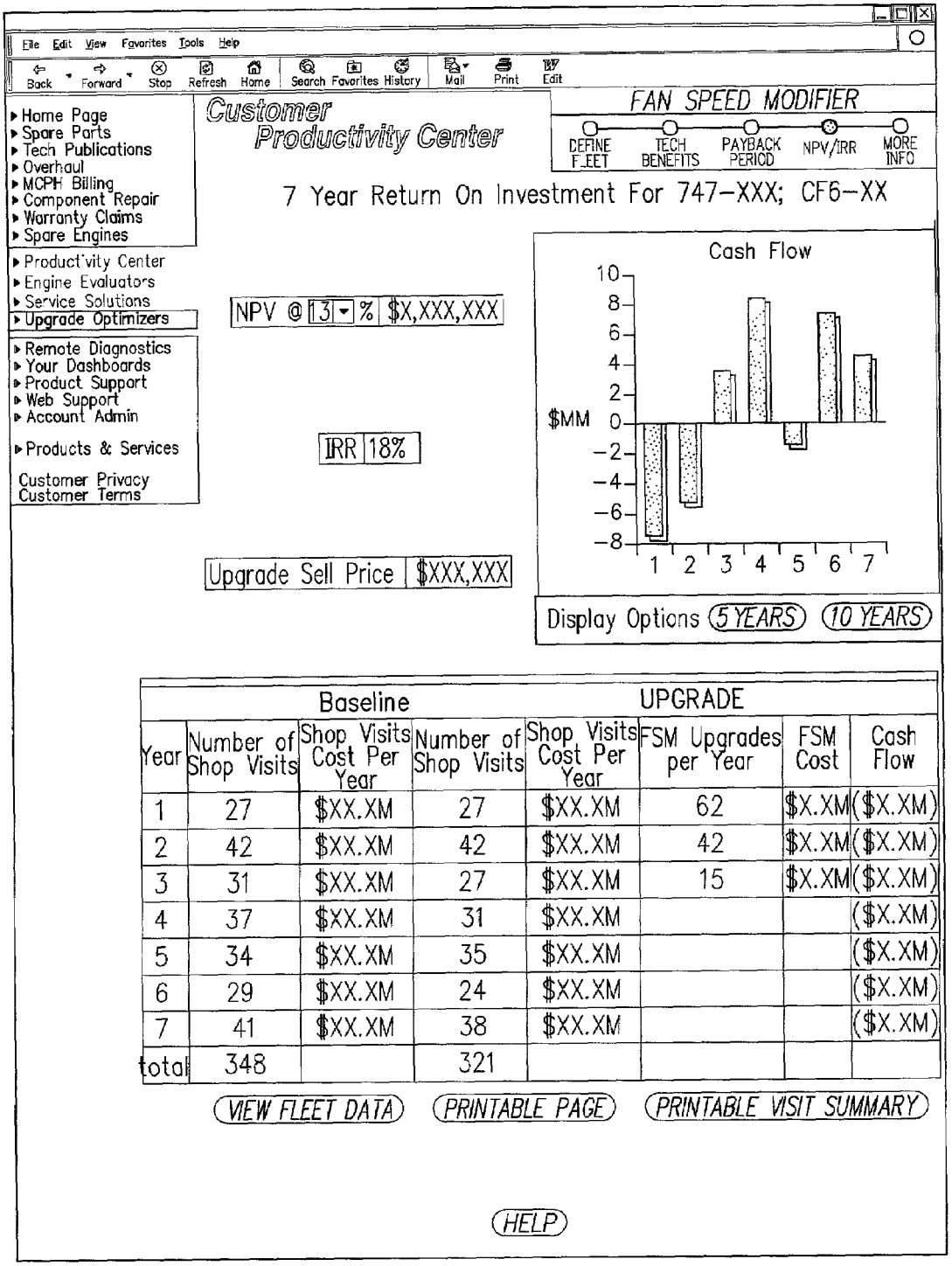
FIG. 19 is an exemplary embodiment of the Fan Speed Modifier Wizard user interfaces depicting variety of reports.

FIGS. 11 and 12 are exemplary embodiments of various user interfaces of the Spare Engine Calculator. Spare Engine Calculator user interfaces are downloaded and displayed by server system 12 (shown in FIG. 1) when the user selects Spare Engine Calculator 144 hypertext link (shown in FIG. 5). Spare Engine Calculator 144 allows the customer to view just what the spare engine coverage should be based on specific individual parameters.

Figure 15:
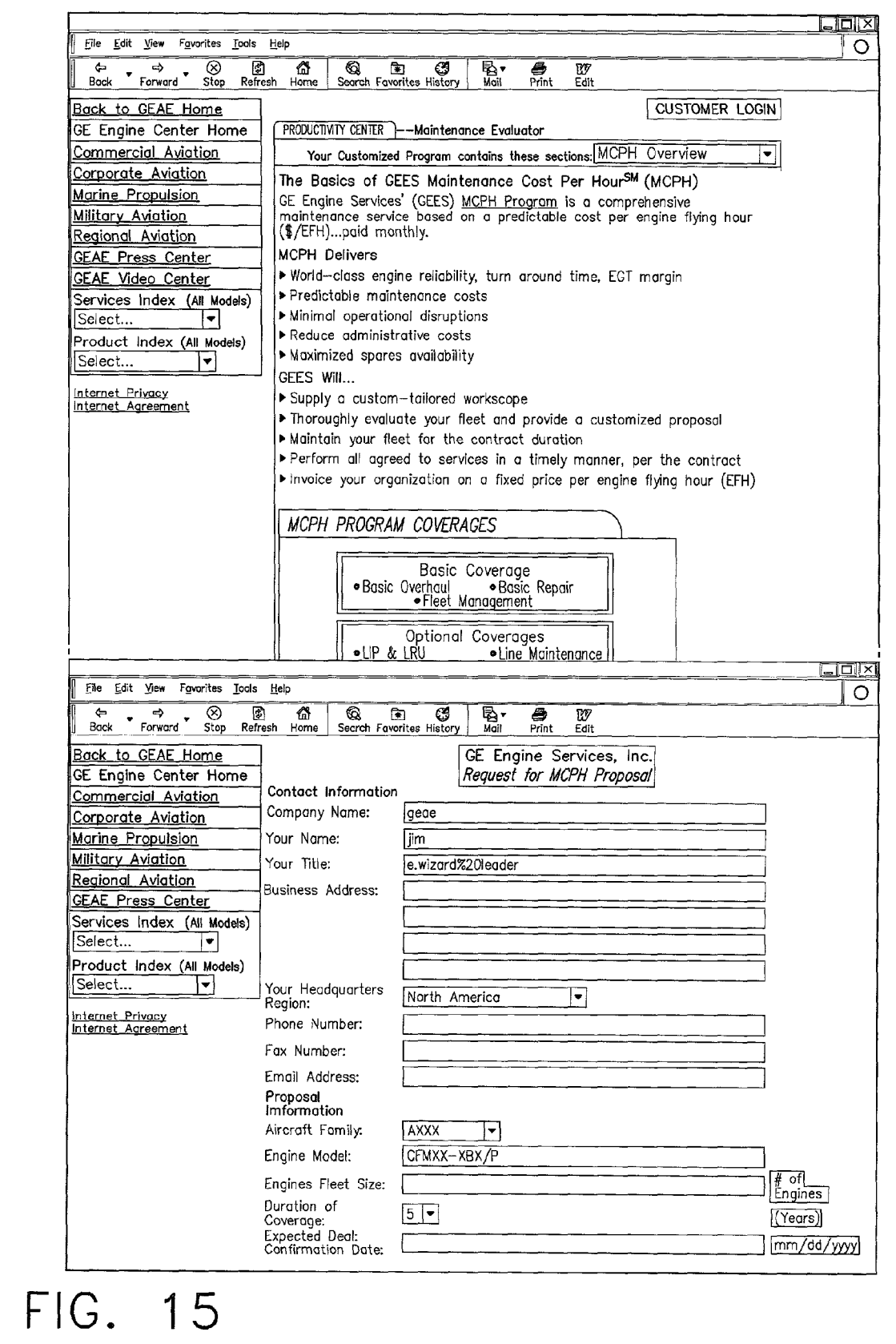

FIGS. 13, 14 and 15 are exemplary embodiments of various user interfaces of Maintenance Evaluator 164. Maintenance Evaluator user interfaces are downloaded and displayed by server system 12 when the user selects Maintenance Evaluator 164 hypertext link (shown in FIG. 6).

Maintenance Evaluator 164 calculates a number of spare engines required for a particular fleet of aircraft. Maintenance Evaluator 164 takes into account the delivery schedule of the aircraft, annual aircraft utilization, the engine's mature shop visit rate (SVR), and the time required to overhaul an engine to determine the provisioning for spare engines required to satisfy a given confidence level. Maintenance Evaluator 164 uses a Poisson statistical distribution to determine the recommended number of spare engines for the specified confidence level of protection.

The customer determines the applicable engine/aircraft combination and then fills out the number of aircraft the customer has in service and the number of hours the customer plan to operate those aircraft on an annual basis. The expected shop visit rate is also inputted in Maintenance Evaluator 164. The customer inputs the value requested depending on the customer's own experience. To calculate a 16-year spare engine plan, the customer selects "display 16 Years." To enter Monthly Airframe delivery schedule, "Advanced." is selected. Lastly, "Required Confidence Level" should be selected which is the probability of having a spare engine on hand when one is required. Based on the values that the customer enters, Maintenance Evaluator 164 calculates the number of recommended spares and also provides the confidence level of the current spare coverage. The customer can undertake "what if" analysis by entering different values and rerun the model to assist in the decision making process.

FIGS. 16, 17, 18 and 19 are exemplary embodiments of various user interfaces of the Fan Speed Modifier Wizard 182. Fan Speed Modifier Wizard 182 user interfaces are downloaded and displayed by server system 12 when the user selects Fan Speed Modifier Wizard 182 hypertext link (shown in FIG. 7).

In one embodiment, client system 14, as well as server system 12, are protected from access by unauthorized individuals. As described, CPC 10 includes an interactive searchable database 20 for customers and customer productivity applications related information. Through CPC 10, managers, sales representatives (including employees, contractors and variable workers) and database administrators directly update, review and generate reports of current information.

While the invention has been described in terms of various specific embodiments, those skilled in the art will recognize that the invention can be practiced with modification within the spirit and scope of the claims.

What is claimed is:

1. A method for organizing customer productivity applications to provide recommendations on product and service offerings relating to aircraft engines using a web-based system including a server system coupled to a centralized interactive database and at least one client system, said method comprising the steps of:

defining customer productivity applications and users of customer productivity applications, wherein the customer productivity applications relate to an aircraft engine evaluator;

selecting at least one module for each customer productivity application, wherein the at least one module is selected from a group comprising an engine value analyzer and a spare engine calculator;

provide access to the customer productivity applications and associated modules to increase customer's productivity, wherein the customer productivity applications and associated modules relate to:

comparing an actual cost of a customer's aircraft engine ownership with a projected cost of aircraft engine ownership of a different make using actual Airframer data;

calculating a number of spare engines required for a customer's fleet of aircraft;

recommending a customer's work scope for a shop visit;

evaluating a customer's maintenance program; and identifying an excess thrust margin of a customer's aircraft engine;

populating the selected modules with user input information, wherein the user input information for the engine value analyzer is based on maintenance and reliability costs, and the user input information for the spare engine calculator is based on a customer's delivery schedule, a customer's fleet utilization, and a customer's engine shop visit rate;

generating tools and information relating to the customer productivity applications based on the user input information; and providing users access to the generated tools and information to facilitate increasing their productivity and minimizing a cost of ownership by analyzing their fleet, perform industry comparisons, and running iterations to develop their optimal performance requirements.

2. A method according to claim 1 wherein said step of defining customer productivity applications further comprises the step of organizing customer productivity applications into sub-sections of the database.

3. A method according to claim 1 wherein said step of populating the selected modules with user input information further comprises populating the selected modules with cost information of engines from multiple manufacturers, said method further comprising performing iterations to develop cost comparisons.

4. A method according to claim 1 wherein said step of defining customer productivity applications further comprises the steps of:

developing methodologies that addresses customer inquiries based on a set of specific questions; and designing web-sites that implement the developed methodologies that address customer inquiries based on a set of specific questions.

5. A method according to claim 1 wherein said step of defining customer productivity applications further comprises the step of designing individual wizard applications that provide recommendations on product and service offerings based on the customer's response to a set of specific questions.

6. A method according to claim 1 wherein said step of defining customer productivity applications further comprises the step of configuring the server system to combine new technology, product specific applications, and customer and industry data to give the customer the ability to facilitate increasing their productivity and minimizing a cost of ownership by analyzing their fleet, performing industry comparisons, and running iterations to develop their optimal performance requirements.

7. A method according to claim 1 wherein said step of populating the selected modules with user input information further comprises the steps of:

identifying information necessary to customer productivity applications; and storing the information in the centralized database in a plurality of sub-sections defined within the database.

8. A customer applications web-site managed by an administrator for organizing customer productivity applications relating to aircraft engines using a web-based system including a server system coupled to a centralized interactive database and at least one client system, said web-site configured to:

complete customer enrollments such that each individual customer is defined in a centralized database based on individual customer's aircraft engine needs and unique identifiers;

provide access to a customer productivity application and associated modules to increase customer's productivity, wherein the customer productivity application and associated modules relate to:

comparing an actual cost of the customer's aircraft engine ownership with a projected cost of aircraft engine ownership of a different make using actual Airframer data;

calculating a number of spare engines required for a customer's fleet of aircraft;

recommending a customer's work scope for a shop visit;

evaluating a customer's maintenance program; and
identifying an excess thrust margin of a customer's aircraft engine;
populate the customer productivity application and associated modules with user supplied information; and
generate reports relating to the customer productivity application and associated modules based on the user supplied information.

9. A web-site according to claim 8 wherein to complete customer enrollment, said web-site further configured to define individual access privileges for users.

10. A web-site according to claim 8 wherein to provide access to a customer productivity application, said web-site further configured to provide access through at least one of pull down menus, check boxes, and hypertext links.

11. A web-site according to claim 8 wherein said web-site further configured to:
retrieve information from the centralized database in response to a specific inquiry by the customer; and
download information in response to the inquiry.

12. A web-site according to claim 11 wherein to download information in response to the inquiry, said web-site further configured to:
access the centralized database;
search the database regarding the specific inquiry;
retrieve information from the database; and
transmit the retrieved information to the client system for display by the client system.

13. A web-site according to claim 8 wherein the client system and the server system are connected via a network and wherein the network is one of a wide area network, a local area network, an intranet and the Internet.

14. A method for organizing customer productivity applications to provide recommendations on product and service offerings relating to aircraft engines using a web-based system including a server system coupled to a centralized interactive database and at least one client system, said method comprising the steps of:
defining customer productivity applications and users of customer productivity applications, wherein the customer productivity applications relate to an aircraft engine service evaluator;
selecting at least one module for each customer productivity application, the at least one module being selected from a group comprising an engine workscoping wizard and a maintenance evaluator;
providing access to the customer productivity applications and associated modules to increase customer's productivity, wherein the customer productivity applications and associated modules relate to:
comparing an actual cost of a customer's aircraft engine ownership with a projected cost of aircraft engine ownership of a different make using actual Airframer data;
calculating a number of spare engines required for a customer's fleet of aircraft;
recommending a customer's work scope for a shop visit;
evaluating a customer's maintenance program; and
identifying an excess thrust margin of a customer's aircraft engine;
populating the selected modules with user input information, wherein the user input information for the engine workscoping wizard is based on a maintenance matrix for a particular engine type and with user requested maintenance requests, wherein the user input information for the maintenance evaluator is based on at least one of technical expertise, cashflow management, program time span, risk transfer products and maintenance program management;
generating tools and information relating to the customer productivity applications based on the user input information; and
providing users access to the generated tools and information to facilitate increasing their productivity and minimizing a cost of ownership by analyzing their fleet, perform industry comparisons, and running iterations to develop their optimal performance requirements.

15. A method according to claim 14 wherein said step of defining customer productivity applications further comprises the step of organizing customer productivity applications into sub-sections of the database.

16. A method according to claim 14 wherein said step of populating the selected modules with user input information further comprises populating the selected modules with additional maintenance needs.

17. A method according to claim 14 wherein said step of defining customer productivity applications further comprises the steps of:
developing methodologies that addresses customer inquiries based on a set of specific questions; and
designing web-sites that implement the developed methodologies that address customer inquiries based on a set of specific questions.

18. A method according to claim 14 wherein said step of defining customer productivity applications further comprises the step of designing individual wizard applications that provide recommendations on product and service offerings based on the customer's response to a set of specific questions.

19. A method according to claim 14 wherein said step of defining customer productivity applications further comprises the step of configuring the server system to combine new technology, product specific applications, and customer and industry data to give the customer the ability to facilitate increasing their productivity and minimizing a cost of ownership by analyzing their fleet, performing industry comparisons, and running iterations to develop their optimal performance requirements.

20. A method according to claim 14 wherein said step of populating the selected modules with user input information further comprises the steps of:
identifying information necessary to customer productivity applications; and
storing the information in the centralized database in a plurality of sub-sections defined within the database.

* * * * *